(12) United States Patent
Arai et al.

(10) Patent No.: US 9,950,576 B2
(45) Date of Patent: Apr. 24, 2018

(54) PRESSURE DETECTOR AND METHOD OF ASSEMBLING THE SAME

(71) Applicants: FUJI ELECTRIC CO., LTD., Kawasaki-shi, Kanagawa (JP); THE YOKOHAMA RUBBER CO., LTD., Tokyo (JP)

(72) Inventors: Souichi Arai, Uenohara (JP); Tsukasa Ishimori, Sagamihara (JP); Daisuke Kanenari, Hiratsuka (JP); Yasuhiko Araki, Hiratsuka (JP)

(73) Assignees: FUJI ELECTRIC CO., LTD., Kawasaki-shi, Kanagawa (JP); THE YOKOHAMA RUBBER CO., LTD., Tokyo (JP)

( * ) Notice: Subject to any disclaimer, the term of this patent is extended or adjusted under 35 U.S.C. 154(b) by 249 days.

(21) Appl. No.: 14/772,121

(22) PCT Filed: Mar. 27, 2014

(86) PCT No.: PCT/JP2014/059006
§ 371 (c)(1),
(2) Date: Sep. 2, 2015

(87) PCT Pub. No.: WO2014/162988
PCT Pub. Date: Oct. 9, 2014

(65) Prior Publication Data
US 2016/0001615 A1 Jan. 7, 2016

(30) Foreign Application Priority Data
Apr. 1, 2013 (JP) ................................ 2013-076383

(51) Int. Cl.
*B60C 23/00* (2006.01)
*G01L 17/00* (2006.01)
*B60C 23/04* (2006.01)

(52) U.S. Cl.
CPC ...... *B60C 23/0433* (2013.01); *B60C 23/0498* (2013.01); *G01L 17/005* (2013.01); *G01L 17/00* (2013.01)

(58) Field of Classification Search
None
See application file for complete search history.

(56) References Cited

U.S. PATENT DOCUMENTS 8,186,208 B2 5/2012 Matsumura
8,305,291 B2 11/2012 Nakatani
(Continued)

FOREIGN PATENT DOCUMENTS

EP 2474429 A1 7/2012
JP 2003-249775 A 9/2003
(Continued)

OTHER PUBLICATIONS

Korea Patent Office, "Office Action for Korean Patent Application No. 10-2015-7023948," dated Nov. 29, 2016.
(Continued)

*Primary Examiner* — Jill Culler
(74) *Attorney, Agent, or Firm* — Manabu Kanesaka

(57) ABSTRACT

A pressure detector includes: a case provided with a hole portion; support pillar members standing on the bottom surface of the case and each including a tapered portion at an end of each of the support pillar members; a circuit board including a sensor having a detection aperture, and mounting holes into which the respective tapered portions are insertable; and a packing provided with a through hole. The case and the circuit board are fixed by a cured resin while the hole portion is connected to the detection aperture via the through hole by inserting the tapered portion of each of the support pillar members into the mounting hole of the circuit
(Continued)

board and by sandwiching the packing between the bottom surface of the case and the sensor.

7 Claims, 6 Drawing Sheets

(56) References Cited

U.S. PATENT DOCUMENTS

| | | | | |
|---|---|---|---|---|
| 8,476,808 | B2* | 7/2013 | Weston | B60C 23/0411 |
| | | | | 310/329 |
| 2010/0148950 | A1 | 6/2010 | Yamaguchi et al. | |
| 2012/0154242 | A1* | 6/2012 | Nakatani | B60C 23/0452 |
| | | | | 343/848 |
| 2015/0013444 | A1* | 1/2015 | Markert | B60C 23/0494 |
| | | | | 73/146.3 |

FOREIGN PATENT DOCUMENTS

| | | | |
|---|---|---|---|
| JP | 5103002 | B2 | 12/2012 |
| KR | 10-1168244 | B1 | 7/2012 |

OTHER PUBLICATIONS

PCT, "International Search Report for International Application No. PCT/JP2014/059006".

Europe Patent Office, "Search Report for European Patent Application No. 14780331.6," dated Oct. 18, 2016.

* cited by examiner

100

PRESSURE DETECTOR AND METHOD OF ASSEMBLING THE SAME

RELATED APPLICATIONS

The present application is National Phase of International Application No. PCT/JP2014/059006 filed Mar. 27, 2014, and claims priority from Japanese Application No. 2013-076383, filed Apr. 1, 2013, the disclosure of which is hereby incorporated by reference herein in its entirety.

FIELD

The present invention relates to a pressure detector disposed inside a tire to detect tire pressure and to transmit the detected tire pressure wirelessly to a controller disposed outside of the tire, and to a method of assembling such a pressure detector.

BACKGROUND

Tire pressure monitoring systems have been widely used in many vehicles such as cars that monitor current gas pressures (tire pressure) in tires and notify the driver of warnings if the pressure in any tire is decreased. In such a known tire pressure monitoring system, wireless pressure detectors are installed inside the tires and on the outer circumference surfaces of the wheels. The pressure detectors transmit detection results of the tire pressures wirelessly to an external controller (pressure monitoring device), and the controller determines the received tire pressures and, as necessary, notifies the driver of warnings of under inflation (see, for example, Patent Literature 1 and 2).

CITATION LIST

Patent Literature

Patent Literature 1: Japanese Patent Application Laid-open No. 2009-184614
Patent Literature 2: Japanese Patent No. 4868192

SUMMARY

Technical Problem

FIG. 6 illustrates an installation example of a pressure detector 100 that constitutes such a tire pressure monitoring system and is disposed inside a tire (rubber tire) 102. As illustrated in FIG. 6, the pressure detector 100 is disposed on the outer circumference surface of a wheel (tire wheel) 104. Installing the tire 102 to the wheel 104 in this state allows the pressure detector 100 to detect the tire pressure in the tire 102 and transmit the detection result wirelessly to an external controller (not illustrated).

FIG. 7 is a block diagram illustrating an example of functional elements of the pressure detector 100. As illustrated in FIG. 7, the pressure detector 100 includes, as the main functional elements, a printed circuit board 106 and a button battery 108, a sensor integrated circuit (IC) 110, a microcomputer 112, a wireless transmission IC 114, and an antenna 116 that are mounted on the printed circuit board 106. In the pressure detector 100, the button battery 108 supplies power to drive the microcomputer 112, and the microcomputer 112 controls the sensor IC 110 in accordance with the computer program thereof to detect the tire pressure. The detection result is transmitted from the wireless transmission IC 114 to the external controller via the antenna 116. The sensor IC 110 is provided with a detection aperture 110a for detecting gas pressure, and the tire pressure (for example, air pressure) inside the tire 102 directly acts on the detection aperture 110a.

To protect the electronic components such as the sensor IC 110 from shocks and vibrations from the tire 102, the pressure detector 100 is usually configured as illustrated in FIG. 8. The printed circuit board 106, on which the sensor IC 110 and other electronic components are mounted, is housed in an open-top box case 118 and a potting compound 120 covers the entire electronic components such as the sensor IC 110.

Such a pressure detector 100 needs to be assembled in such a manner in which the detection aperture 110a formed on the sensor IC 110 will not be buried in the potting compound 120. In a conventional method, as illustrated in FIG. 9, a cap member 122 provided with a vertical through hole 122a is put on the sensor IC 110 mounted on the printed circuit board 106 so that the sensor aperture 110a will not be buried in the potting compound 120. The cap member 122 is usually bonded and fixed on the sensor IC 110 with adhesives so as not to move from a proper position during curing of the potting compound 120. In FIG. 9, the microcomputer 112 and some other components of the electronic components mounted on the printed circuit board 106 are omitted so that the drawing can be easily understood.

The assembling method illustrated in FIG. 8 uses adhesives to fix the cap member 122. This configuration requires additional work time for bonding the cap member 122 and waiting for the adhesives to be cured, and thus, efficient assembling operation is difficult.

The present invention is made in view of the problem of the conventional technique described above, and it is an object of the present invention to provide a pressure detector and a method of assembling the pressure detector that can achieve shorter work time and efficient assembling operation.

Solution to Problem

A pressure detector according to the present invention is disposed inside a tire to detect tire pressure and to transmit the detected tire pressure wirelessly to a controller disposed outside of the tire, and includes: a case provided with a hole portion formed through a bottom surface of the case to allow gas inside the tire to pass through; a plurality of support pillar members standing on the bottom surface of the case and each including a tapered portion at an end of each of the support pillar members, the tapered portion becoming thinner toward the end; a circuit board including: a sensor having a detection aperture for detecting a gas pressure and mounted on a lower surface of the circuit board facing the bottom surface of the case; and a plurality of mounting holes into which the respective tapered portions of the support pillar members are insertable; and a packing provided with a through hole that connects an upper surface of the packing to a lower surface of the packing, wherein the case and the circuit board are fixed by a cured resin while the hole portion is connected to the detection aperture via the through hole by inserting the tapered portion of each of the support pillar members into the mounting hole of the circuit board and by sandwiching the packing between the bottom surface of the case and the sensor.

A method of assembling a pressure detector according to the present invention is a method of assembling the pressure detector disposed inside a tire to detect tire pressure and to transmit the detected tire pressure wirelessly to a controller disposed outside the tire, and includes: standing a plurality of support pillar members on a bottom surface of a case provided with a hole portion formed through the bottom surface to allow gas inside the tire to pass through, the support pillar members each including a tapered portion at an end of each of the support pillar members, the tapered portion becoming thinner toward the end; connecting, in a state where a circuit board including: a sensor having a detection aperture for detecting a gas pressure and mounted on a lower surface of the circuit board; and a plurality of mounting holes into which the respective tapered portions of the support pillar members are insertable faces the bottom surface of the case, the hole portion to the detection aperture via the through hole by inserting the tapered portion of each of the support pillar members into the mounting hole of the circuit board and by sandwiching the packing between the bottom surface of the case and the sensor; and fixing the case and the circuit board by filling the case with a resin and curing the resin.

According to the configuration and the method described above, the support pillar members provided in the case each include a tapered portion, and the tapered portion is inserted into each of the mounting holes of the circuit board. This configuration allows the support pillar members to function as holding members each having a wedge shape, and can prevent unsteadiness of the circuit board and firmly hold and fix the circuit board to the case. Sandwiching the packing between the bottom surface of the case and the sensor integrates the case, the packing, and the sensor, and stabilizes the integrated components. This configuration can completely separate, from the outer part, a flow line connecting the hole portion to the detection aperture through the through hole, thereby preventing a resin such as a potting compound from flowing into the flow line. This configuration can shorten the work time, and thus allows efficient assembling operation. Moreover, this configuration can prevent the electronic components from moving from the proper positions during curing of the resin. The bottom surface around the hole portion provided to the case is surely closed with the packing, and can prevent the leakage of a liquid-form resin that has been poured into the case from the hole portion to the outside of the case.

The tapered portion of each of the support pillar members includes a base having an outer diameter larger than an inner diameter of the mounting holes and includes a leading end having an outer diameter smaller than the inner diameter of the mounting holes. This configuration facilitates the insertion of the tapered portion into each of the mounting holes, and allows the tapered portion to properly function as a holding member having a wedge shape.

The support pillar members each include a base portion having an outer diameter larger than the inner diameter of each of the mounting holes and the tapered portion provided on a top surface of the base portion. The base of the tapered portion is disposed on the top surface of the base portion. This configuration easily determines the height position of the circuit board from the bottom surface of the case by the top surfaces of the base portions provided at first stages of the support pillar members.

Advantageous Effects of Invention

According to the present invention, the support pillar members function as the holding members each having a wedge shape, and can prevent unsteadiness of the circuit board and firmly hold and fix the circuit board to the case. Sandwiching the packing between the bottom surface of the case and the sensor integrates the case, the packing, and the sensor, and stabilizes the integrated components. This configuration can completely separate, from the outer part, the flow line from the hole portion to the detection aperture through the through hole, thereby preventing a resin such as a potting compound from flowing into the flow line. This configuration shortens the work time, and allows efficient assembling operation.

DESCRIPTION OF EMBODIMENTS

A preferred embodiment of a pressure detector according to the present invention is fully described in relation to a method of assembling the pressure detector with reference to the accompanying drawings.

Figure 1:
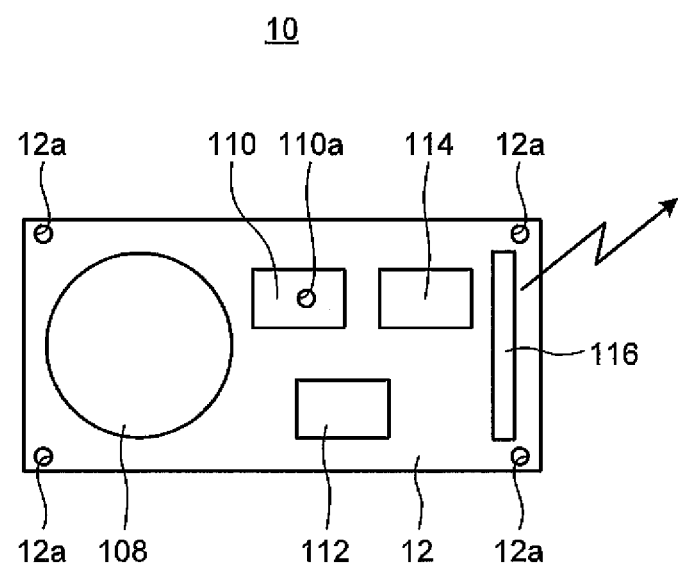
FIG. 1 is a block diagram illustrating functional elements of a pressure detector according to an embodiment of the present invention.

FIG. 1 is a block diagram illustrating functional elements of a pressure detector 10 according to an embodiment of the present invention. The same reference signs as those illustrated in FIGS. 6 to 9 above are given to the same or equivalent elements in FIG. 1, and indicate that the elements have the same or equivalent functions and effects. Thus, the detailed descriptions thereof are omitted and this is also applied to FIGS. 2 to 5.

Figure 6:
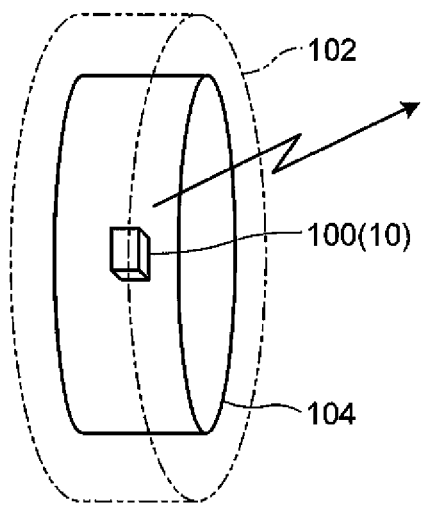
FIG. 6 is a diagram illustrating an installation example of the pressure detector, installed inside a tire, constituting a tire pressure monitoring system.
Figure 7:
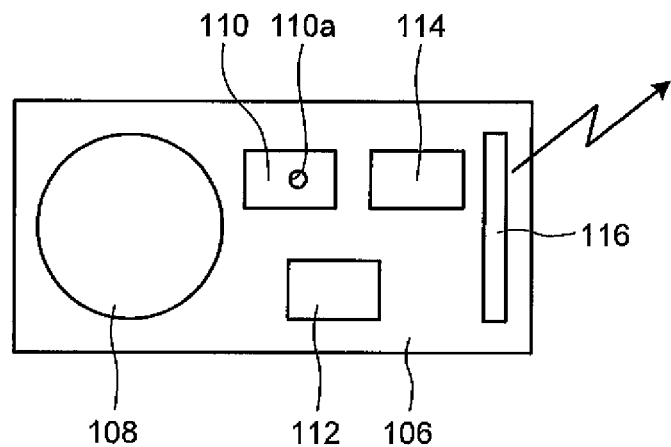
FIG. 7 is a block diagram illustrating an example of functional elements of a pressure detector according to a conventional technique.
Figure 8:
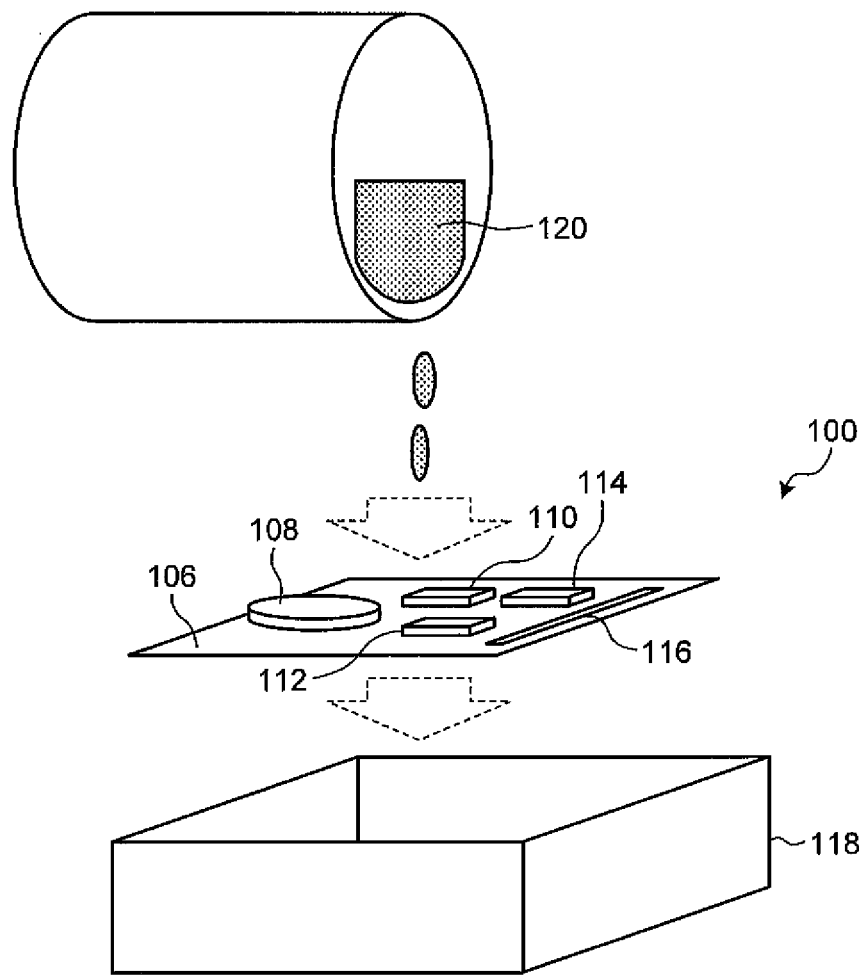
FIG. 8 is an exploded perspective view illustrating a method of assembling the pressure detector illustrated in FIG. 7.
Figure 9:
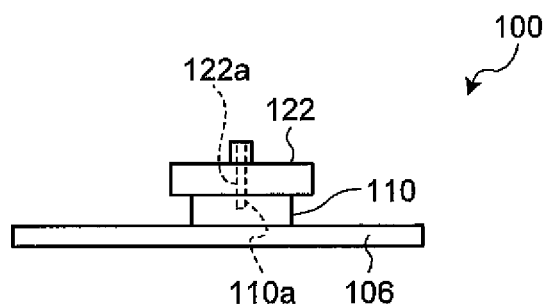
FIG. 9 is a side view of a sensor IC of the pressure detector illustrated in FIG. 7 covered with a cap member.

The pressure detector 10 according to the present embodiment is, same as the pressure detector 100 illustrated in FIG. 6, a wireless transmission sensor that is disposed inside the tire 102 and on the outer circumference surface of the wheel 104 to detect pressure (tire pressure) of gas such as air or nitrogen sealed inside the tire 102 and to transmit the detection result wirelessly to an external controller (pressure monitoring device) (not illustrated) (see FIG. 6). In other words, the pressure detector 10 constitutes, together with other devices such as the controller, a tire pressure monitoring system that measures the current tire pressure in the tire 102 and notify, for example, the driver of warnings if the pressure is decreased.

As illustrated in FIG. 1, the pressure detector 10 includes, as the main functional elements, a printed circuit board 12 and the button battery 108, the sensor IC (sensor, pressure sensor) 110, the microcomputer 112, the wireless transmission IC 114, and the antenna 116 that are mounted on the printed circuit board 12. The printed circuit board (circuit board, printed board) 12 has the same configuration as that of the printed circuit board 106 illustrated in FIG. 7, except that the printed circuit board 12 is provided with mounting holes 12a disposed at four corners of the printed circuit board 12 and formed through the printed circuit board 12 in the thickness direction.

In the pressure detector 10, the button battery 108 supplies power to drive the microcomputer 112, and the microcomputer 112 controls the sensor IC 110 in accordance with the computer program thereof to detect the tire pressure. The detection result is transmitted from the wireless transmission IC 114 to the external controller via the antenna 116. The tire pressure (for example, air pressure) in the tire 102 directly acts on the detection aperture 110a for detecting gas pressure, and thus, the sensor IC 110 can detect the tire pressure.

Figure 2:
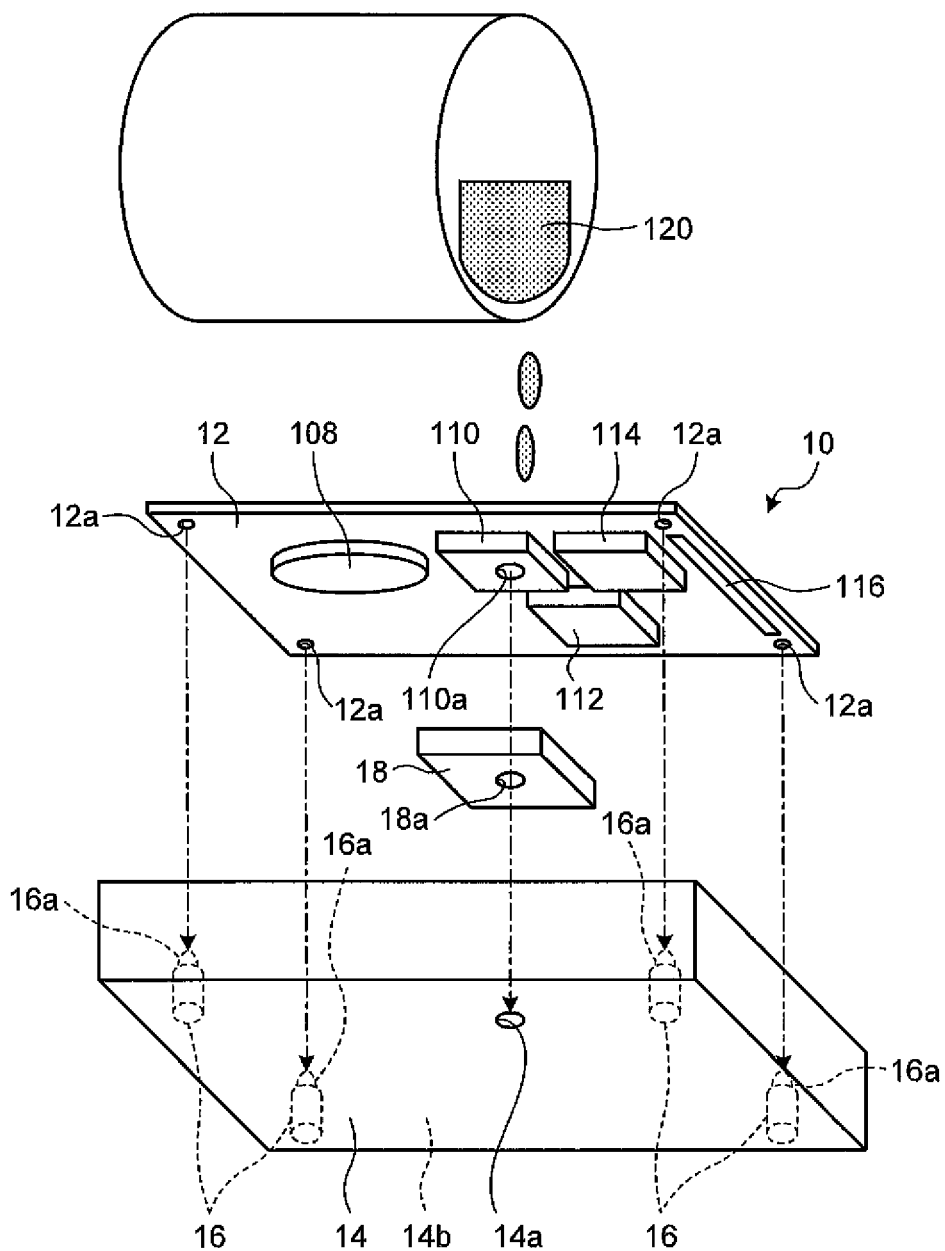
FIG. 2 is an exploded perspective view illustrating a method of assembling the pressure detector illustrated in FIG. 1.
Figure 3:
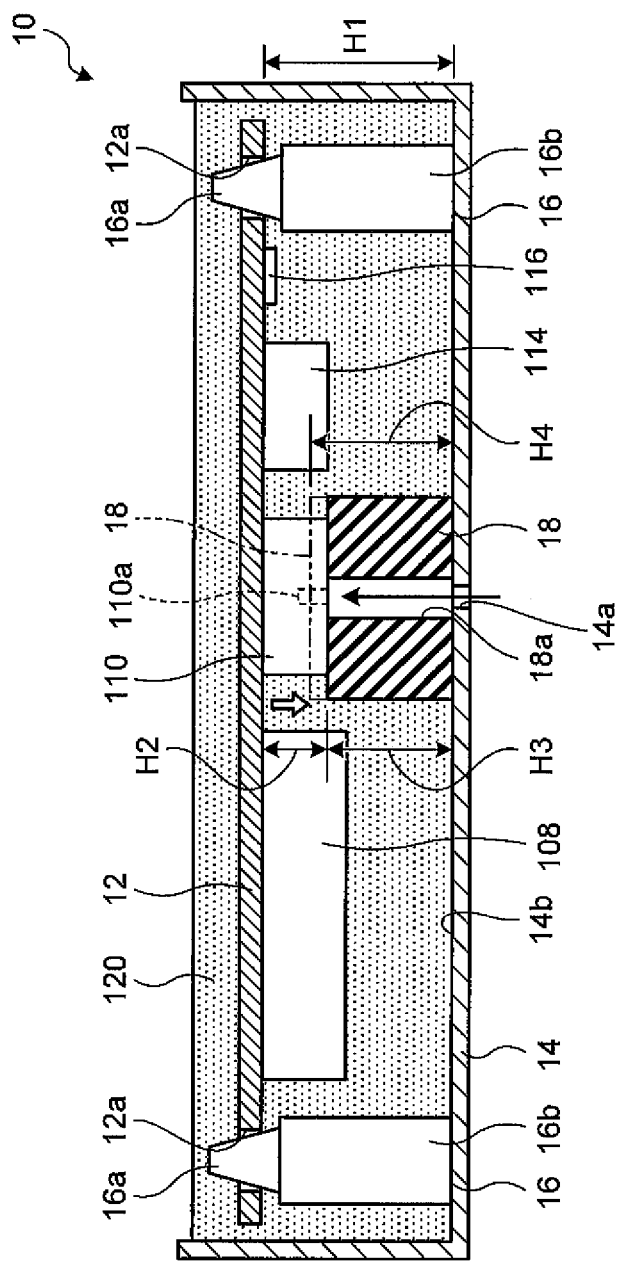
FIG. 3 is a vertical cross-sectional view of the pressure detector assembled by the assembling method illustrated in FIG. 2.

FIG. 2 is an exploded perspective view illustrating a method of assembling the pressure detector 10 illustrated in FIG. 1, and FIG. 3 is a vertical cross-sectional view of the pressure detector 10 assembled by the assembling method illustrated in FIG. 2.

Although the pressure detector 10 also adopts a structure for protecting the electronic components such as the sensor IC 110 mounted on the printed circuit board 12 from shocks and vibrations from the tire 102, as the pressure detector 100 does as described above, the structure and the assembling method thereof differ from those of the pressure detector 100.

Described first is a method of assembling the pressure detector 10.

As illustrated in FIGS. 2 and 3, the method of assembling the pressure detector 10 starts by standing support pillar members (pin members) 16 at four corners of a bottom surface 14b of a case 14. The case 14 is provided with a hole portion 14a formed through the bottom surface 14b to allow gas inside the tire 102 to pass through. Each support pillar member 16 includes a tapered portion 16a at an end that becomes thinner toward the end. The support pillar members 16 may be disposed in other positions than the four corners, and the number of support pillar members 16 disposed on the bottom surface 14b may be changed as appropriate.

The printed circuit board 12 is put downwards towards the bottom surface 14b of the case 14 with the lower surface of the printed circuit board 12 on which the sensor IC 110 and other components are mounted facing the bottom surface 14b to insert the tapered portions 16a of the support pillar members 16 into the respective mounting holes 12a. Simultaneously, a plate-like packing 18 provided with a through hole 18a connecting the upper surface to the lower surface of the packing 18 is sandwiched between the bottom surface 14b of the case 14 and the lower surface (a surface on which the detection aperture 110a is formed) of the sensor IC 110. With this configuration, the hole portion 14a of the case 14 is connected to the detection aperture 110a in the sensor IC 110 via the through hole 18a.

In the pressure detector 10, the detection aperture 110a, the through hole 18a, and the hole portion 14a are configured to overlap with one another. Although the detection aperture 110a, the through hole 18a, and the hole portion 14a are connected to align in the vertical direction as illustrated in FIG. 3, they may be connected in other configurations. For example, the detection aperture 110a, the through hole 18a, and the hole portion 14a may be connected along a sloping direction. The through hole 18a may be bent or curved in the packing 18 to connect the hole portion 14a and the detection aperture 110a at different positions in the plan view, which allows the components to be arranged more flexibly.

The packing 18 is formed by, for example, rubber or silicone sheet material having a rectangular shape. The packing 18 is pressed to change the thickness, and tightly adheres to the lower surface of the sensor IC 110 and the bottom surface 14b. This configuration makes the hole portion 14a, the through hole 18a, and the detection aperture 110a, which are connected with each other, a kind of duct that opens to the outside of the case 14 with being completely separated from the inner space of the case 14. To easily place the packing 18 in a proper position, the through hole 18a preferably has an inner diameter larger than that of the hole portion 14a of the case 14 and that of the detection aperture 110a.

After the support pillar members 16 are inserted into the mounting holes 12a and the packing 18 is sandwiched between the sensor IC 110 and the case 14, the potting compound 120 is poured from the upper surface of the printed circuit board 12. After the liquid potting compound 120 that has filled the case 14 is cured, the case 14 and the printed circuit board 12 are fixed to each other. The electronic components including, for example, the sensor IC 110 are entirely covered with the potting compound 120 and sealed, and the assembling operation of the pressure detector 10 is completed.

The potting compound 120 may be a curable resin that is generally used for sealing of electronic component. Examples of the potting compound 120 include polyurethane resins, epoxy resins, polyolefin resins, silicone resins, and fluorine-based resins. Any resins, such as a resin cured by using a hardener, a thermosetting resin, or a resin having flexibility in the cured state, can be used that function as a potting compound (encapsulation compound) or a sealant.

Described next are detailed configurations of the components included in the pressure detector 10 assembled as described above.

Figure 4:
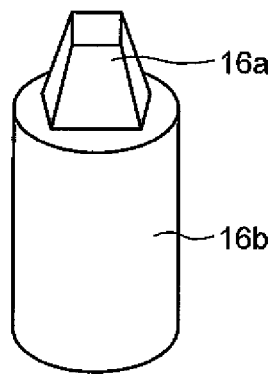
FIG. 4 is a perspective view of a support pillar member.
Figure 5:
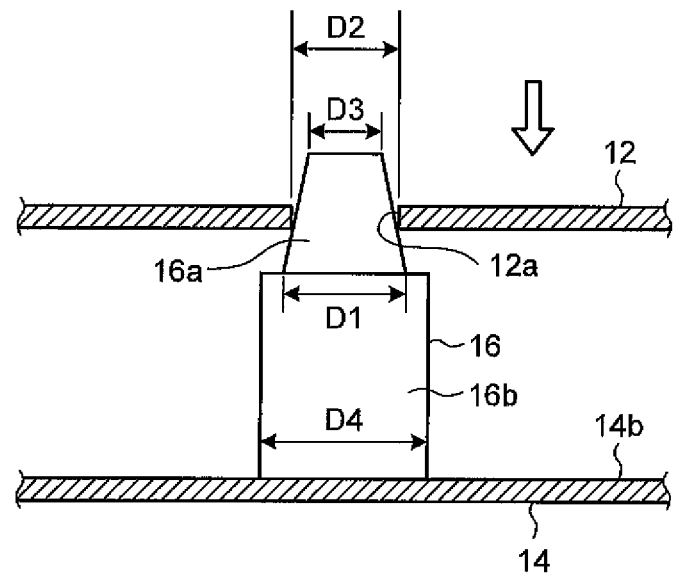
FIG. 5 is an enlarged cross-sectional view of a main part in which the support pillar member illustrated in FIG. 4 supports a printed circuit board.

FIG. 4 is a perspective view of a support pillar member 16, and FIG. 5 is an enlarged cross-sectional view of a main part in which the support pillar member 16 illustrated in FIG. 4 supports the printed circuit board 12. As illustrated in FIG. 4, the support pillar member 16 has a two-part configuration including a circular pillar (base portion) 16b and a square-shaped tapered portion 16a protruding from the top surface of the circular pillar 16b. The base of the tapered portion 16a is disposed on the top surface of the circular pillar 16b and has a tapered shape that becomes thinner toward the upper end. The tapered portion 16a may have other shapes than the square shape such as a conical shape and a polygonal shape. The circular pillar 16b may be a square pillar.

As illustrated in FIG. 5, in the support pillar members 16, an outer diameter D1 of the base of the tapered portion 16a is equal to or larger than an inner diameter D2 of the mounting holes 12a of the printed circuit board 12, and an outer diameter D3 of the leading end of the tapered portion 16a is smaller than the inner diameter D2 of the mounting holes 12a (D3<D2≤D1). An outer diameter D4 of the circular pillar 16b is larger than the inner diameter D2 of the mounting hole 12a (D2<D4).

In the pressure detector 10, the tapered portions 16a provided at second stages of the support pillar members 16 are inserted into the mounting holes 12a of the printed circuit board 12 as illustrated in FIGS. 3 and 5. The tapered portions 16a each include the base having the outer diameter D1 equal to or larger than the inner diameter D2 of the mounting holes 12a and include the leading end having the outer diameter D3 smaller than the inner diameter D2 of the mounting holes 12a. This configuration allows the tapered portions 16a to be easily inserted into the mounting holes 12a. This configuration also allows the support pillar members 16 (tapered portions 16a) to function as the holding members each having a wedge shape to prevent unsteadiness of the printed circuit board 12 and to firmly hold and fix it. The outer diameter D4 of the circular pillar 16b is larger than the inner diameter D2 of the mounting holes 12a. This configuration can determine the height position of the printed circuit board 12 from the bottom surface 14b of the case 14 by the top surfaces of the circular pillars 16b provided at first stages of the support pillar members 16.

FIG. 3 illustrates a state in which mounting of the printed circuit board 12 to the case 14 has been completed. Assuming that H1 denotes the height between the lower surface of the printed circuit board 12 and the bottom surface 14b of the case 14, the height H1 is equal to the sum of the height of the sensor IC 110 denoted by H2, and the height of the packing 18 denoted by H3 (H1=H2+H3). In other words, the packing 18, which is sandwiched between the lower surface of the sensor IC 110 and the bottom surface 14b of the case 14, originally has a height H4 that is larger than the height H3 in an unpressed state (in the original shape, see the alternate long and two short dashes line in FIG. 3).

In the pressure detector 10, the pressed packing 18 firmly adheres to the sensor IC 110 and the case 14. This configuration integrates the case 14, the packing 18, and the sensor IC 110, and stabilizes the integrated components. This configuration can completely separate, from the outer part, the flow line (gas flow line) from the hole portion 14a through the through hole 18a to the detection aperture 110a, thereby preventing the potting compound 120 from flowing into the flow line. This configuration can shorten the work time, and thus allows efficient assembling operation. Moreover, this configuration can prevent the components from moving from the proper positions during curing of the potting compound 120. The bottom surface 14b around the hole portion 14a is surely closed with the packing 18, and can prevent the leakage of the potting compound 120 in liquid form that has been poured into the case 14 from the hole portion 14a to the outside of the case 14.

The present invention is not limited to the above-described embodiment, and various changes can freely be made to the embodiment without departing from the scope of the present invention.

REFERENCE SIGNS LIST

10, 100 Pressure detector
12, 106 Printed circuit board
12a Mounting hole
14, 118 Case
14a Hole portion
14b Bottom surface
16 Support pillar member
16a Tapered portion
16b Circular pillar
18 Packing
18a Through hole
102 Tire
104 Wheel
108 Button battery
110 Sensor IC
110a Detection aperture
112 Microcomputer
114 Wireless IC
116 Antenna
120 Potting compound
122 Cap member

The invention claimed is:

1. A pressure detector adapted to be disposed inside a tire to detect a tire pressure and to transmit a detected tire pressure wirelessly to a controller disposed outside the tire, the pressure detector comprising:
    a case provided with a hole portion formed through a bottom surface of the case to allow gas inside the tire to pass therethrough;
    a plurality of support pillar members standing on the bottom surface of the case and each including a tapered portion at an end of each of the plurality of support pillar members, the tapered portion becoming thinner toward the end;
    a circuit board including:
        a sensor having a detection aperture for detecting a gas pressure and mounted on a lower surface of the circuit board facing the bottom surface of the case; and
        a plurality of mounting holes into which the tapered portions of the plurality of support pillar members are insertable; and
    a packing provided with a through hole communicating between an upper surface of the packing and a lower surface of the packing,
    wherein the case and the circuit board are fixed through a cured resin while the hole portion is communicated with the detection aperture via the through hole by inserting the tapered portions of the plurality of support pillar members into the plurality of mounting holes of the circuit board and by sandwiching the packing between the bottom surface of the case and the sensor, and
    the tapered portion of each of the plurality of support pillar members includes a base having an outer diameter larger than an inner diameter of each of the plurality of mounting holes, and a leading end having an outer diameter smaller than the inner diameter of each of the plurality of mounting holes, and supports the circuit board between the base and the leading end.

2. The pressure detector according to claim 1, wherein the plurality of support pillar members each includes a base portion having an outer diameter larger than the inner diameter of each of the plurality of mounting holes and the tapered portion provided on a top surface of the base portion, and
    the base of the tapered portion is disposed on the top surface of the base portion.

3. A method of assembling a pressure detector disposed inside a tire to detect a tire pressure and to transmit a detected tire pressure wirelessly to a controller disposed outside the tire, the method comprising:
    preparing a case provided with a hole portion formed through a bottom surface of the case to allow gas inside the tire to pass therethrough; a plurality of support pillar members each including a tapered portion at an end of each of the plurality of support pillar members, the tapered portion becoming thinner toward the end; a circuit board including a sensor having a detection aperture for detecting a gas pressure and mounted on a lower surface of the circuit board, and a plurality of mounting holes into which the tapered portions of the plurality of support pillar members are insertable; and a packing provided with a through hole communicating between an upper surface of the packing and a lower surface of the packing, standing the plurality of support pillar members on the bottom surface of the case;

facing the circuit board to the bottom surface of the case;

inserting the tapered portions of the plurality of support pillar members into the plurality of mounting holes of the circuit board, and sandwiching the packing between the bottom surface of the case and the sensor;

communicating the hole portion with the detection aperture via the through hole; and fixing the case and the circuit board by filling the case with a resin and curing the resin, wherein in the step of preparing the case, the plurality of support pillar members, the circuit board, and the packing, the plurality of support pillar members is prepared to have the tapered portions, each including a base having an outer diameter larger than an inner diameter of each of the plurality of mounting holes, and a leading end having an outer diameter smaller than the inner diameter of each of the plurality of mounting holes, and supporting the circuit board between the base and the leading end.

4. The pressure detector according to claim 1, wherein the packing is an elastic body having a first height, and is sandwiched between the bottom surface of the case and the sensor of the circuit board such that the elastic body has a second height smaller than the first height, and the hole portion, the detection aperture, and the through hole are linearly arranged each other to form a linear gas flow completely separated from an inner space of the case, and the upper surface of the packing is larger than the sensor, and the packing supports the sensor to entirely cover the sensor.

5. The pressure detector according to claim 4, wherein the through hole has an inner diameter larger than those of the hole portion and the detection aperture to easily place the packing in a proper position.

6. The method of assembling the pressure detector according to claim 3, wherein in the step of preparing the case, the plurality of support pillar members, the circuit board, and the packing, the packing is prepared to include an elastic body having a first height, and to be sandwiched between the bottom surface of the case and the sensor of the circuit board such that the elastic body has a second height smaller than the first height, and the hole portion, the detection aperture, and the through hole are linearly arranged each other to form a linear gas flow completely separated from an inner space of the case; and the packing is prepared to have the upper surface larger than the sensor, and to support the sensor to entirely cover the sensor.

7. The method of assembling the pressure detector according to claim 6, wherein in the step of preparing the case, the plurality of support pillar members, the circuit board, and the packing, the packing is prepared to include the through hole having an inner diameter larger than those of the hole portion and the detection aperture to easily place the packing in a proper position.

* * * * *